US006889233B2

(12) United States Patent
Lin et al.

(10) Patent No.: US 6,889,233 B2
(45) Date of Patent: May 3, 2005

(54) SELECTIVE FILE PURGING FOR DELETE OR RENAME

(75) Inventors: Yun Lin, Kirkland, WA (US); Shishir Pardikar, Redmond, WA (US); Venkataraman Ramanathan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 476 days.

(21) Appl. No.: 09/883,897

(22) Filed: Jun. 18, 2001

(65) Prior Publication Data

US 2003/0009480 A1 Jan. 9, 2003

(51) Int. Cl.$^7$ .............................................. G06F 17/00
(52) U.S. Cl. ...................... 707/200; 707/10; 707/205
(58) Field of Search ........................... 707/1, 200, 204, 707/205; 709/203, 245

(56) References Cited

U.S. PATENT DOCUMENTS

| | | | | | |
|---|---|---|---|---|---|
| 5,732,240 | A | * | 3/1998 | Caccavale | 711/118 |
| 5,742,819 | A | * | 4/1998 | Caccavale | 707/200 |
| 5,819,033 | A | * | 10/1998 | Caccavale | 709/224 |
| 5,835,756 | A | * | 11/1998 | Caccavale | 707/1 |
| 5,854,901 | A | * | 12/1998 | Cole et al. | 709/245 |
| 5,892,937 | A | * | 4/1999 | Caccavale | 711/135 |
| 6,067,599 | A | * | 5/2000 | Kishi et al. | 711/113 |
| 6,385,642 | B1 | * | 5/2002 | Chlan et al. | 709/203 |

OTHER PUBLICATIONS

Coulouris et al. ("Distributed Systems Concepts and Design", Second Edition, and Coulouris hereinafter, 1994, pp. 198, 201 and 258.*
CIFS Benefits, msdn online Web Workshop, updated Oct. 18, 1999, http://msdn..microsoft.com/workshop/networking/cifs/benefits.asp.
CIFS: An Internet File System Protocol, msdn online Web Workshop, updated Sep. 3, 1998, pp. 1–2, http://msdn.microsoft.com/workshop/networking/cifs/.
Just What is SMB?, Richard Sharpe, Sep. 27, 1999, pp. 1–10, http://samba.anu.edu.au/cifs/docs/what–is–smb.html.
WIN32 NetWare Core Protocol Revisited, Dr. Dobb's Journal, vol. 22 #10 (1997) pp. 60, 62–64, 103–104.
Design of the 3Com 3+ Local Area Network File System, W. Paul Sherer, Digest of Papers, COMPCON Spring '87. Thirty–Second IEEE Computer Society International Conference. Intellectual Leverage (Cat. No. 87CH2409–1). IEEE Comput. Soc. Press 1987, pp. 2–5.
Design of Distributed File System on Local Network and its Implementation, Hu Guanrong & Li Shengli Publisher: Editorial Board J. Huazhong Univ. of Sci. & Tech., vol. 27, No. 7, pp. 9–10 [1999 China].
Definition of SMB, Webopedia, http://webopedia.internet.com/TERM/S/SMB.html.
Definition of CIFS, Webopedia, http://webopedia.internet.com/TERM/C/CIFS.html.
Chapter 29—Windows 98 Network Architecture, Microsoft TechNet, Dec. 4, 2000, http://www.microsoft.com/technet/Win98/Restkit/Part6/wrkc29.asp.
Chapter 10—Disks and File Systems, Microsoft TechNet, Dec. 4, 2000, http://www.microsoft.com/TechNet/win98/reskit/part2/wrkc10.asp.

* cited by examiner

Primary Examiner—Safet Metjahic
Assistant Examiner—Haythim Alaubaidi
(74) Attorney, Agent, or Firm—Merchant & Gould P.C.

(57) ABSTRACT

A method of purging cached open files from a client-side delayed close list on a remote file system. The remote file system stores a unique file identifier for each cached open file which is independent of the cached file's namespace. In response to a delete or rename command of a remote target file, the remote file system obtains a target file identifier from the target file's server. The remote file system then compares the target file identifier with each of the cached file's unique file identifier. If a cached file's unique file identifier matches the target file identifier, the cached file is purged from the delayed close list.

23 Claims, 5 Drawing Sheets

SELECTIVE FILE PURGING FOR DELETE OR RENAME

TECHNICAL FIELD

The present invention relates to remote file access, and more specifically to purging delayed file closes before a remote file delete or file rename operation is performed.

BACKGROUND OF THE INVENTION

Efficient and secure information transfer between computers over a computer network has become a paramount concern in most every corporate and educational organization today. A key element to efficient and secure information transfer is the network file system employed by modern computers. A network file system manages file sharing between computers requesting data ("clients") and computers supplying the data ("servers"). A central goal in computer network design issue is increasing network file system performance without compromising the integrity of the network.

One of the most performance costly operations carried out by network file systems is a file open operation. A file open request is typically issued by a client before any file access is granted by a server. During the file open operation, the client and server perform time-consuming handshaking, negotiating, and security verification procedures to ensure network integrity is maintained. If an application repeatedly opens and closes the same remote file in quick succession, the overhead penalty of each open operation can significantly degrade network system performance.

To minimize the overhead penalty of repeated open requests, network file systems typically delay closing open files for several seconds in the event an application will quickly re-access the same file again. Stalling a file close command is also referred to herein as caching file opens or caching an open file. Broadly speaking, the file system records the filenames of cached open files in a delayed close list (also known as a scavenger list) and waits until a timeout occurs. Unless the application issues another open request for the remote file, the close file command is sent to the remote server after the timeout and the file reference is deleted from the delayed close list. However, if the same application quickly follows a close request with a file open request for the same remote file, the file system disregards the application's earlier close command. To the server, it appears as though the client never closed the file between file accesses. Thus, caching file opens helps the network file system avoid repeated file open operations by consolidating successive remote file accesses.

One problem associated with delaying file closes occurs when a delete or rename operation is requested for an aliased file. Aliased files have two or more filenames that refer to the same file. Generally, file aliasing exists in operating systems which support file access using both a FAT32 or NTFS filename (long filename) and a FAT16 filename (short filename or 8.3 filename). In such operating systems, a remote file may be opened using either its long filename or its short filename.

The problem arises when a client issues a file delete command or a file rename command shortly after issuing a file close command for the same remote file using different names for the same file. From the client's perspective, the two commands should be carried out without trouble since the file is closed before the delete or rename command is sent to the remote server. As discussed above, however, the network file system delays sending the file close command to the server to improve system performance and, unless corrected, the delete command will be sent to the server before the close command. From the server's perspective, a file sharing violation is created when the client tries to delete a file before closing it. Complicating the matter even further is the fact that the close command and the delete/rename command use different filenames to identify the same remote file. Thus, the network file system cannot discover or prevent the conflicting operations by searching the delayed close list for the same filenames.

One known solution to this problem is to aggressively purge all files from the delayed close list that may potentially cause a file sharing violation to occur whenever a remote file delete or remote file rename command is received by the network file system. Thus, when a remote file delete/rename command is issued by an application, all potential file aliasing candidates in the delayed close list are quickly closed regardless of a timeout occurrence before the delete/rename command is sent to the remote server. For example, when a client requests a remote file to be deleted, the network file system closes all files in the delayed close list with the same server name and share name as the remote file, even though their filenames and/or directory names may differ. This approach ensures that any cached open file that potentially aliases the file to be deleted or renamed is closed before the delete/rename command is issued to the remote server.

One drawback of the above approach is that a large number of casualty files not aliasing the delete or rename command filename are typically purged from the delayed close list unnecessarily. When the client subsequently tries accessing these casualty files, the network file system must reopen these files using the costly file open operation. Thus, system performance is degraded when casualty files are purged from the delayed close list to prevent server sharing violations.

SUMMARY OF THE INVENTION

The present invention overcomes the above-mentioned shortcomings of network file systems by referencing a unique file identifier (FID) in the delayed close list. The unique FID always identifies the same remote file regardless of the filename used. In one embodiment of the invention, when a remote target file is to be deleted or renamed, the network file system obtains the target file's unique FID from the server's file management system. The network file system then purges only those files in the delayed close list whose unique FID matches the unique FID of the target file. Files in the delayed close list whose unique FIDs do not match the target file's unique FID are left open. In this manner, casualty files are eliminated and system performance is greatly improved.

Accordingly, one aspect of the present invention is a method for purging cached open files from a delayed close list which reference a target file located on a remote server. The cached open files include cached filenames and the target file includes a target filename. The method includes a storing operation for storing a unique file identifier for each of the cached files. Furthermore, the unique file identifier is independent of the cached filenames. A receiving operation receives a target file identifier for the target file from the server, wherein the target file identifier is independent of the target filename. The method also includes a purging operation that purges from the delayed close list the cached open files having the same unique file identifier as the target file identifier.

In accordance with other aspects, the present invention relates to a computer-readable medium having stored thereon a data structure for purging a delayed close list of cached open files. The data structure includes a namespace field representing a network filename for a remote file, and a unique file identifier independent of the network filename.

Another aspect of the present invention is a computer program product readable by a computing system and encoding a computer program of instructions for executing a computer process for purging a cached open file from a delayed close list which references a target file located on a server. The computer process includes storing a file namespace and a unique file identifier for the cached open file, wherein the unique file identifier is independent of the file namespace. A receiving operation receives a target namespace and a target file identifier for the target file. Likewise, the target file identifier is independent of the target namespace. The computer process includes purging from the delayed close list the cached open file if the cached open file has the same unique file identifier as the target file identifier.

These and various other features, as well as advantages, which characterize the present invention, will be apparent from a reading of the following detailed description and a review of the associated drawings.

DETAILED DESCRIPTION OF THE INVENTION

Figure 1:
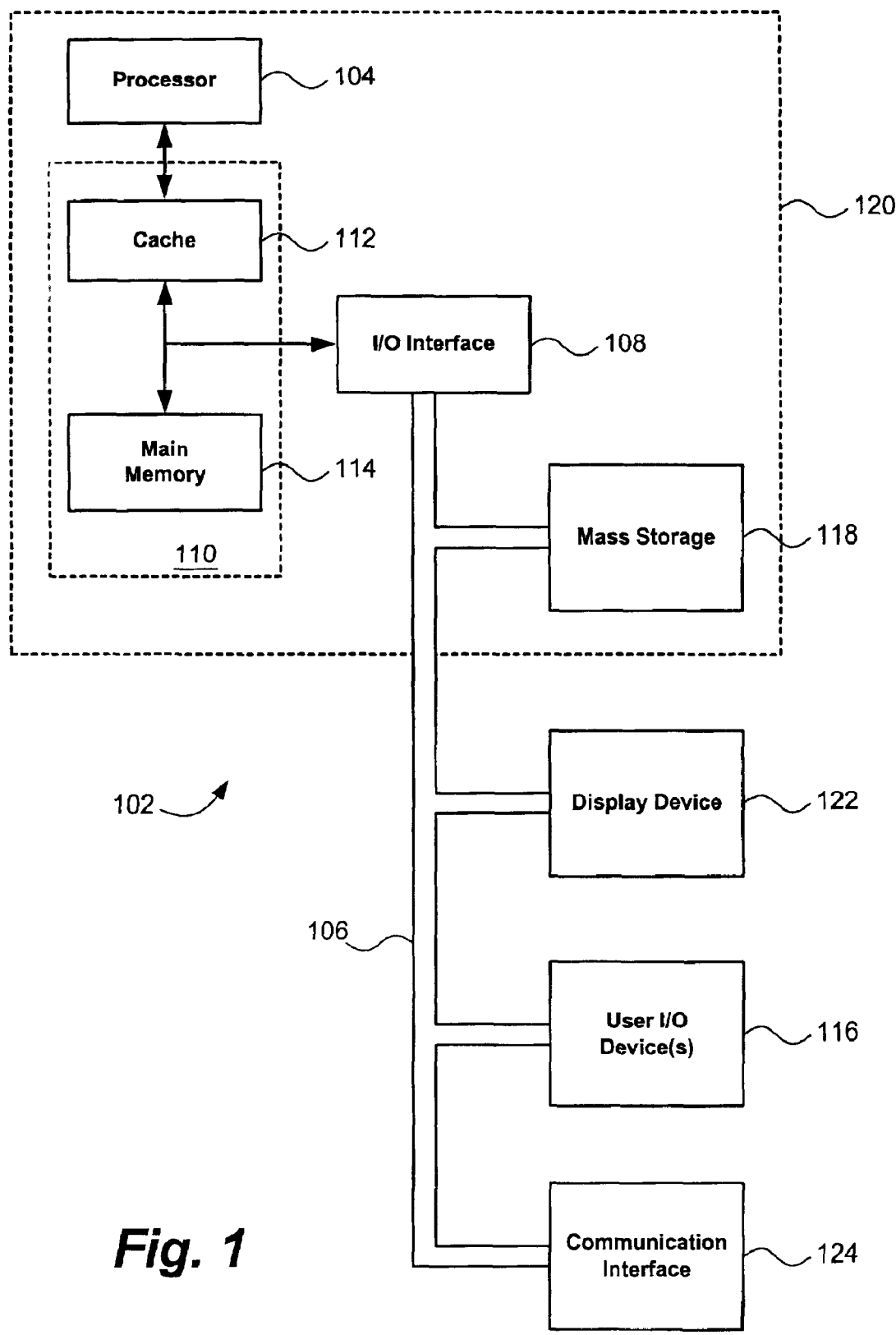
FIG. 1 shows the basic functional units of a computing device implementing various embodiments of the present invention.

The invention is described in detail below with reference to the figures. When referring to the figures, like structures and elements shown throughout are indicated with like reference numerals.

The present invention involves referencing a unique file identifier (FID) to more efficiently handle cached open files on a network file system. Techniques for caching open files on network file systems are well known and are beneficially used in conjunction with the present invention. However, the present invention incorporates a unique FID field to remote file references and allows for more rigorous file identification of cached open files on delayed close lists.

In FIG. 1, the basic functional units of a computing device 102 implementing various embodiments of the present invention are shown. Thus, particular embodiments discussed herein may be realized using a general-purpose computer. However, it is expressly understood that the inventive features of the present invention may be usefully embodied in a number of alternative processor architectures that will benefit from the performance features of the present invention. Accordingly, these alternative embodiments are equivalent to the particular embodiments shown and described herein.

FIG. 1 shows a typical computing device 102 incorporating a general-purpose processor 104 in accordance with an embodiment of the present invention. The computing device 102 comprises an address/data bus 106 for communicating data and control information, at least one processor 104 coupled with the bus 106 through an input/output (I/O) interface 108, and a memory system 110 coupled with the processor 104 for storing information and instructions. The memory system 110 includes, for example, cache memory 112 and main memory 114. Cache memory 112 includes one or more levels of cache memory. In a typical embodiment, the processor 104, I/O interface 108, and some or all of cache memory 112 may be integrated in a single integrated circuit, although the specific components and integration density are a matter of design choice selected to meet the needs of a particular application.

User I/O devices 116 are coupled to the bus 106 and are operative to communicate information in appropriately structured form to and from the other parts of the computer 102. User I/O devices 116 may include a keyboard, mouse, card reader, magnetic or paper tape, magnetic disk, optical disk, or other available input devices, including another computer. A mass storage device 118 is coupled to the bus 106 and may be implemented using one or more magnetic hard disks, magnetic tapes, CDROMs, large banks of random access memory, or the like. A wide variety of random access and read only memory technologies are available and are equivalent for purposes of the present invention. The mass storage 118 may include computer programs and data stored therein. In addition, some or all of the mass storage 118 may be configured to be incorporated as a part of the memory system 110.

In a typical computing device 102, the processor 104, I/O interface 108, memory system 110, and mass storage device 118, are coupled to the bus 106 formed on a printed circuit board and integrated into a single housing as suggested by the dashed-line box 120. However, the particular components chosen to be integrated into a single housing are based upon market and design choices. Accordingly, it is expressly understood that fewer or more devices may be incorporated within the housing suggested by dashed line 120.

Display device 122 is used to display messages, data, a graphical or command line user interface, or other communications with the user. Display device 122 may be implemented, for example, by a cathode ray tube (CRT) monitor, liquid crystal display (LCD) or any available equivalent.

A communication interface 124 is utilized for carrying out digital or mixed analog-digital communications with other electrical devices over a network. The communication interface 124 may carry out wire based communications and/or wireless communications. Various communication protocols may be supported by the communication interface 124 including, but not limited to, Transmission Control Protocol/Internet Protocol (TCP/IP), and Common Internet File System (CIFS) protocol. Of particular importance to the present invention, the communication interface 124 allows the computer device 102 to access remote files stored on servers by means of a network file system.

As used herein, a network file system refers generally to a mechanism responsible for file access between clients and servers over a computer network. The network file system is typically a service or component of a network operating system, such as the Microsoft(R) Windows NT(R) operating system. Microsoft and Windows NT are registered trademarks of Microsoft Corporation.

Figure 2:
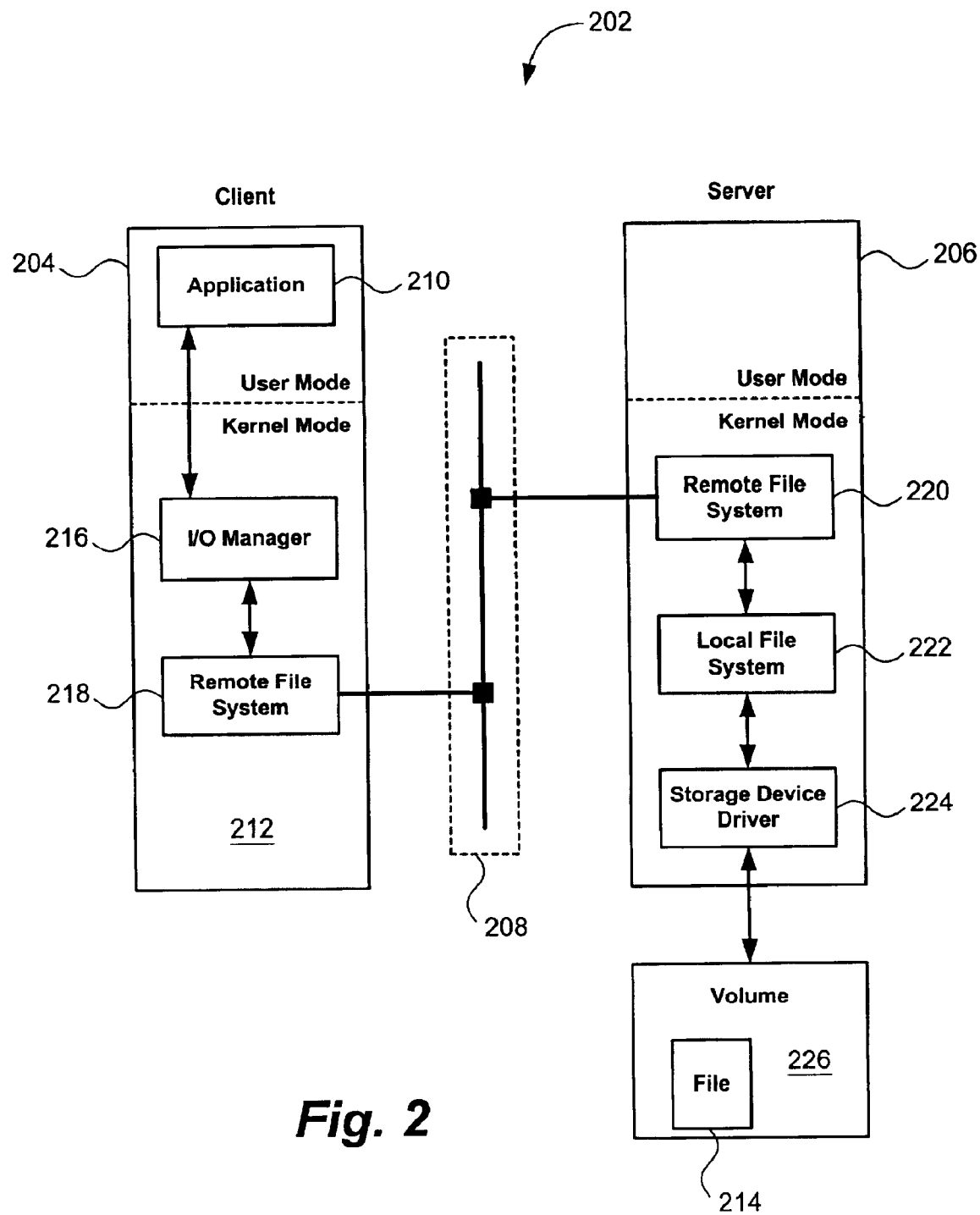
FIG. 2 illustrates a representation of a typical computer network system utilizing an embodiment of the present invention.

In FIG. 2, a representation of a typical computer network system 202 utilizing an embodiment of the present invention is shown. The network system 202 may be implemented on a local area network (LAN) or a wide area network (WAN). Furthermore, LANs may be implemented using any available topology such as a hub and spoke topology and a loop topology. During discussions of embodiments of the present invention, a client-server network arrangement is referred to and illustrated. It should be noted, however, that other conventional network arrangements, such as a peer-to-peer network arrangement, may be utilized in connection with the present invention.

The computer network system 202 consists of a client 204 communicating with a server 206 through a network 208. The client 204 includes at least one application 210 executed under a client-side operating system 212. Typically, the application 210 is executed under a non-privileged processor mode (referred to as "User Mode") and is given only limited system access through the operating system 212. The operating system, on the other hand, is run under a privileged processor mode (referred to as "Kernel Mode") and is given full system access to memory and processor commands.

When the application 210 requires access to a remote file 214, it sends a remote I/O request through the operating system 212 to an I/O manager 216. The I/O manager 216, in turn, passes remote I/O requests to the client-side remote file system 218 for further processing. The remote file system 218 accepts and translates the I/O request into network file system protocol commands that are sent to a server-side remote file system 220.

The server-side remote file system 220 listens for commands coming from the network 208 and issues the I/O request to a local file system 222. The local file system 222 carries out the I/O request by interfacing with a device driver 224 that manages the volume 224 on which the remote file 214 or directory that the I/O command is intended for resides.

Figure 3:
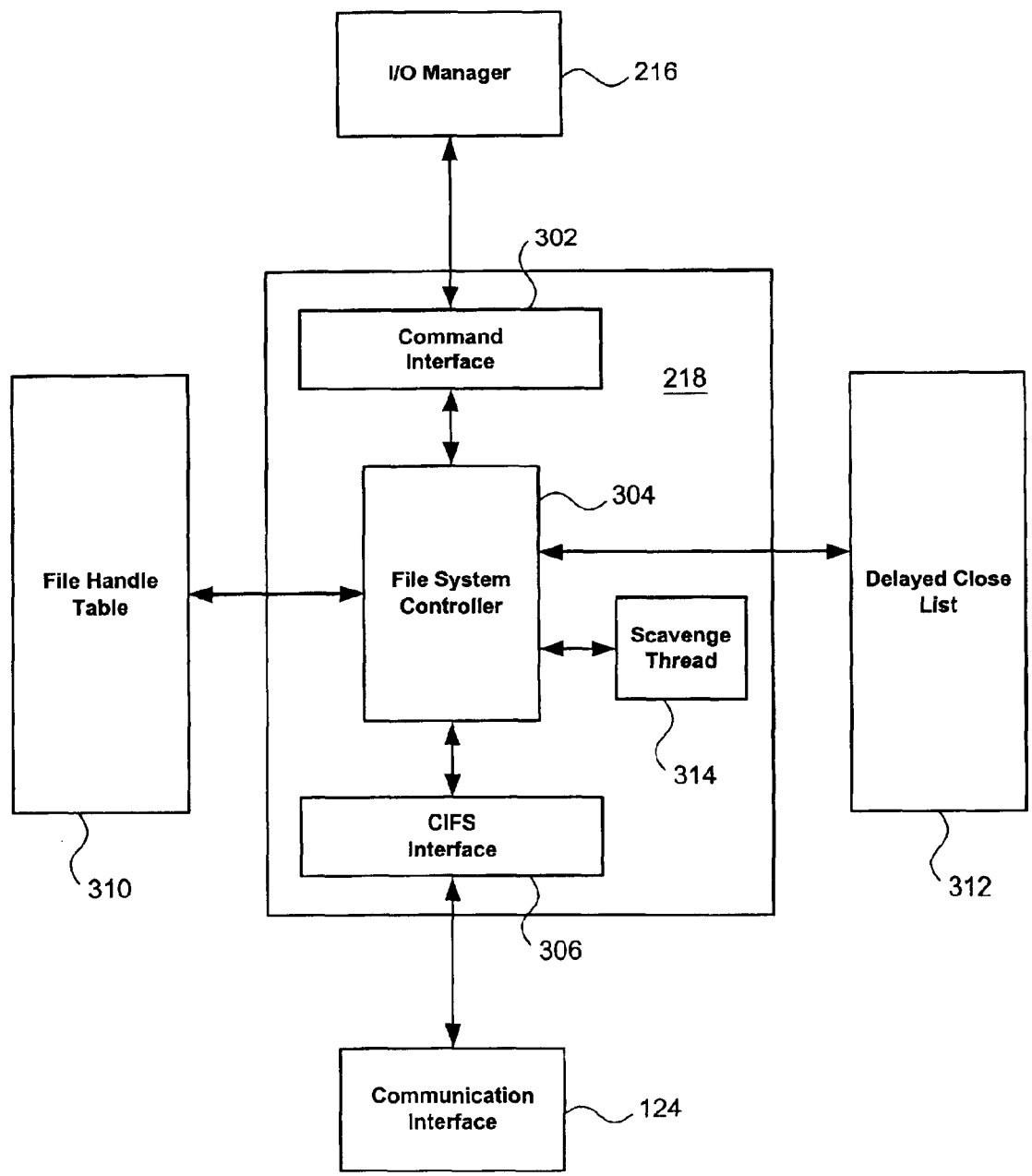
FIG. 3 shows a more detailed functional diagram of a client-side remote file system as contemplated by the present invention.

In FIG. 3, a more detailed functional diagram of one embodiments of a client-side remote file system 218 contemplated by the present invention is shown. The remote file system 218 includes a command interface 302 coupled with the I/O manager 216. The command interface 302 is configured to exchange remote I/O messages between the I/O manager 216 and a file system controller 304. The command interface 302 may also interact with a cache manager (not shown) to cache server file data on the client system.

The file system controller 304 manages various aspects of remote file access, such as server negotiation, cache coherency, security verification, and data formatting. In one embodiment of the present invention, the file system controller 304 is coupled with an CIFS interface 306. The CIFS interface 306 packages data sent from the client to a remote server according to the CIFS protocol. Additionally, the CIFS interface 306 translates CIFS formatted data received from remote servers and passes it to the file system controller 304.

The file system controller 304 maintains a file handle table 310 listing handles of remote files accessed by the client. Each file handle in the file handle table 310 points to a file control block (FCB), thereby allowing the file system controller 304 to quickly identify an opened remote file. Furthermore, each FCB incorporates file objects containing access information about the remote file and its server.

Figure 4A:
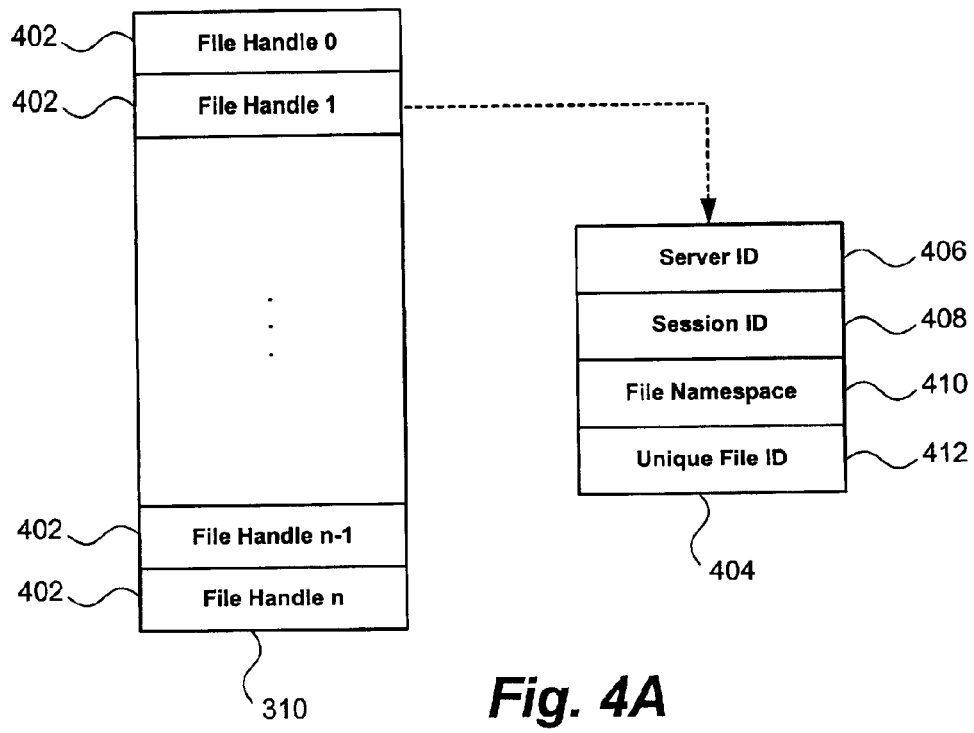
FIG. 4A shows a representation of the file handle table as contemplated by the present invention.

With reference now to FIG. 4A, a representation of the file handle table 310 is shown. As mentioned above, the file handle table 310 includes a plurality of remote file handles 402 pointing to FCB 404 structures. The FCB 404 may include such fields as a server ID 406, a session ID 408, and a file namespace 410 of the associated remote file. In accordance with embodiments of the present invention, the FCB 404 also includes a unique FID 412 which is independent of the file namespace 410. In one embodiment of the present invention, the unique FID 412 is a 64-bit universal file ID supplied by an NTFS file system.

Figure 4B:
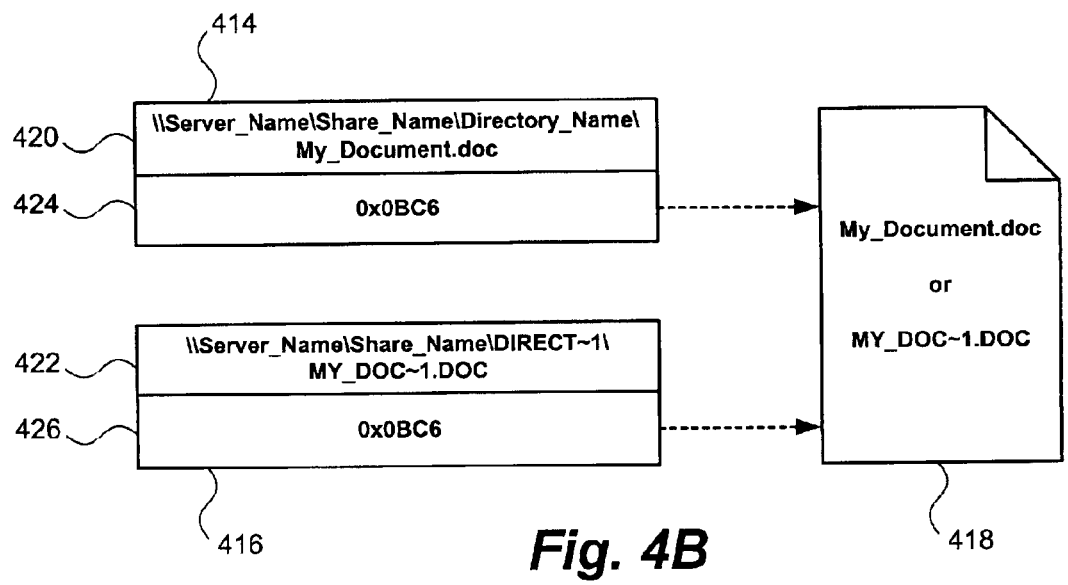
FIG. 4B illustrates two file control blocks referencing the same remote file using different filenames while maintaining the same unique file identifier.

The unique FID 412 is used to match FCBs referencing the same remote file using different file namespaces. For example, one FCB may reference a remote file by its long (FAT32) filename and another FCB may reference the same remote file by its short (FAT16) filename. Such an example is illustrated in FIG. 4B, where a first FCB 414 and a second FCB 416 having different file namespace entries reference the same remote file 418. The remote file 418 is named My_Document.doc, however, it is also aliased as MY_DOC~1.DOC to ensure compatibility with the FAT16 file system format. Accordingly, the namespace field 420 of the first FCB 414 contains the long filename format, while the namespace field 422 of the second FCB 416 contains the short filename format. Nevertheless, both FCBs 414 and 416 refer to the same remote file 418 and contain the same unique FID value (64-bit) in their respective unique FID fields 424 and 426.

Returning to FIG. 3, when an application no longer requires access to a remote file, it typically issues a close command to the I/O manager 216. The command interface 302 intercepts the close command and passes it to the file system controller 304. The file system controller 304 then checks whether other executing applications are accessing the remote file. If no other application is accessing the remote file, the file system controller 304 removes the remote file's handle from the file handle table 310 and places the handle in a delayed close list 312, thereby caching the file open.

In addition to caching the file open on the delayed close list 312, the file system controller 304 creates a scavenge thread 314 which counts down a brief time delay. The time delay is typically between 2 to 5 seconds, and may be adjusted to optimize system performance. If, during the time delay, an open command corresponding to a file cached in the delayed close list 312 is received by the command interface 302, the file system controller 304 removes the file handle from the delayed close list 312 and restores the handle in the file handle table 310. In doing so, remote file access overhead is reduced by eliminating repeated open commands. If, on the other hand, the remote file is not accessed again before the timeout delay completes, the file system controller 304 sends a close command to the file server via the CIFS interface 306 and the file handle entry is removed from the delayed close list 312.

To prevent network sharing violations, as discussed earlier, the client must ensure that a remote target file is not cached on the delayed close list 312 before the client attempts to delete or rename the target file. In one embodiment of the present invention, the file system controller 304 ensures all entries referencing the remote target file are purged from the delayed close list 312 before deleting or renaming the target file. This is achieved by comparing the recorded unique FIDs of all the entries in the delayed close list 312 with the unique FID of the target file. Hence, any delayed close list entry containing a unique FID matching the target file's unique FID is expressly closed and removed from the delayed close list 312. By utilizing the unique FIDs of delayed close list entries, only those entries aliasing the remote target file are purged from delayed close list 312. Therefore, the present invention greatly reduces the inefficiencies of aggressive prior art purging techniques which remove non-target related entries from the delayed close list 312.

Figure 5:
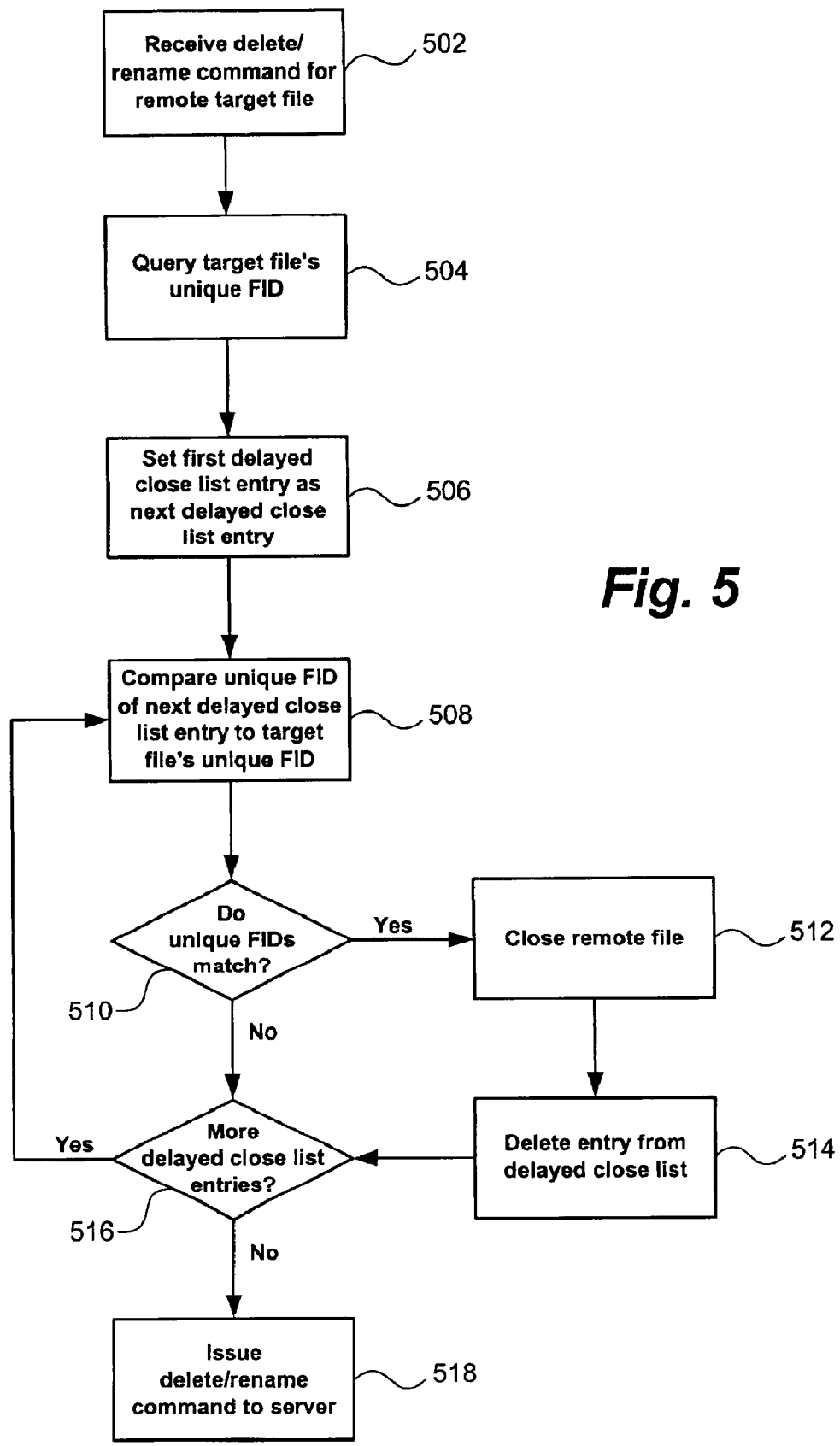
FIG. 5 shows a control flow diagram contemplated by the present invention for purging entries in a delayed close list.

In FIG. 5, a control flow diagram contemplated by the present invention for purging entries in a delayed close list 312 is shown. The control flow begins at receiving operation 502 wherein the client-side remote file system 218 receives a command from an executing application 210 to delete or rename a remote target file 214. As described above, remote I/O commands may be issued through an I/O manager 216 and intercepted by a command interface 302 in the remote file system 218. Once the delete or rename command is received by the remote file system 218, control passes to querying operation 504.

In querying operation 504, the client 204 queries the server 206 for the unique FID 412 of the target file 214. The unique FID 412, as earlier mentioned, is a value assigned to the target file 214 which is independent of the filename used to identify the target file 214. The FID is obtained when the file is opened. Thus, the same unique FID 412 is returned to the client 204 whether the client 204 uses a FAT16 filename or a FAT32 filename to identify the target file 214. Once the target file's unique FID 412 is received from the server 206, control proceeds to operation 506.

In operation 506, the file system controller 304 prepares to examine all delayed close list entries for matching unique FIDs by setting the first delayed close list entry as a next delayed close list entry. Control then passes to comparing operation 508.

In comparing operation 508, the remote file system 218 compares the unique FID of the next delayed close list entry to the unique FID of the remote target file 214. Beginning with the first delayed list entry, the comparing operation 508 tests the next delayed close list entry each time it is invoked. Once the next delayed close list entry is examined, control transfers to branching operation 510.

In branching operation 510, the result from comparing operation 508 is examined. If the unique FIDs of the next delayed close list entry and the remote target file matched in comparing operation 508, this indicates that the next delayed close list entry is referencing the target file 214 and must be purged from the delayed close list 312 before the delete or rename command is issued to the server 206. Thus, the branching operation 510 passes control to closing operation 512.

In closing operation 512, the remote file referenced by the next delayed close list entry (i.e. the target file) is closed by client 204. In a particular embodiment of the present invention, the CIFS interface 306 issues a file close command to the server 206 over the network 208. Next, control is passed to deleting operation 514, where the next delayed close list entry is deleted from the delayed close list 312.

After deleting operation 514 is executed, or if the unique FIDs of the next delayed close list entry and the remote target file did not match in comparing operation 508, control passes to branching operation 516. In this operation, the remote file system 218 determines if all the delayed close list entries have been examined. If more entries in the delayed close list 312 need to be compared with the unique FID of the target file 214, control loops back to comparing operation 508. If, on the other hand, every delayed close list entry has been examined, control branches to issuing operation 518.

When the control flow reaches issuing operation 518, all delayed close list entries referencing the remote target file 214, whether by the target file's long filename or its aliased short filename, have been purged from the delayed close list 312. Thus, the client issues the delete or rename command received in operation 502 to the server 206 without causing a file sharing violation.

It should be recognized by the reader that the logical operations of the various embodiments of the present invention described above may be implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. It will be recognized by one skilled in the art that these operations, structural devices, acts and modules may be implemented in software, in firmware, in special purpose digital logic, and any combination thereof, without deviating from the spirit and scope of the present invention as recited within the claims attached hereto.

Although the invention has been described in language specific to computer structural features, methodological acts and by computer readable media, it is to be understood that the invention defined in the appended claims is not necessarily limited to the specific structures, acts or media described. As an example, the unique FID field 412 may be included in the session ID field 408. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. In a network operating system containing a client-side delayed close list of cached open files with cached filenames, a method for the delayed close list the cached open files which reference a target file located on a remote server, the target file having a target filename, the method comprising:

storing a unique file identifier for each of the cached files, wherein the unique file identifier is independent of the cached filenames;

receiving a target file identifier for the target file from the server, wherein the target file identifier is independent of the target filename; and purging from the delayed close list the cached open files having the same unique file identifier as the target file identifier.

2. The method of claim 1, further comprising receiving a delete command for the target file from an application executing on the networking operating system.

3. The method of claim 2, further comprising issuing the delete command to the remote server.

4. The method of claim 1, further comprising receiving a rename command for the target file from an application executing on the networking operating system.

5. The method of claim 4, further comprising issuing the rename command to the remote server.

6. The method of claim 1, further comprising querying the remote server for the unique file identifier.

7. The method claim 1, further comprising querying the remote server for the target file identifier.

8. The method for claim 1, wherein the purging further comprises comparing the unique file identifier with the target file identifier.

9. The method of claim 1, wherein the purging further comprises closing the cached open files having the same unique file identifier as the target file identifier.

10. The method of claim 1, wherein the purging further comprises deleting entries from the delayed close list corresponding to the cached open files having the same unique file identifier as the target file identifier.

11. The method of claim 1, wherein the unique file identifier and the target file identifier are universal file identifiers.

12. The method of claim 1, wherein the method is encoded in a computer program product readable by computing system.

13. A computer program product readable by a computing system and encoding a computer program of instructions for executing a computer process for purging from a client-side delayed closed list a cached open file which references a target file located on a server, the computer process comprising:

storing a file namespace for the cached open file;

storing a unique file identifier for the cached open file, wherein the unique file identifier is independent of the file namespace;

receiving a target namespace for the target file;

receiving a target file identifier for the target file from the server, wherein the target file identifier is independent of the target namespace; and purging from the delayed close list the cached open file if the cached open file has the same unique file identifier as the target file identifier.

14. The computer program of claim 13, wherein the computer process further comprises receiving a delete command for the target file from an executing application.

15. The computer program of claim 14, wherein the computer process further comprises issuing the delete command to the server.

16. The computer program of claim 13, wherein the computer process further comprises receiving a rename command for the target file from an executing application.

17. The computer program of claim 16, wherein the computer process further comprises issuing the rename command to the server.

18. The computer program of claim 13, wherein the computer process further comprises querying the server for the unique file identifier.

19. The computer program of claim 13, wherein the computer process further comprises querying the server for the target file identifier.

20. The computer program of claim 13, wherein the purging further comprises comparing the unique file identifier with the target file identifier.

21. The computer program of claim 13, wherein the purging further comprises closing the cached open files having the same unique file identifier as the target file identifier.

22. The computer program of claim 13, wherein the purging further comprises deleting entries from the delayed close list corresponding to the cached open files having the same unique file identifier as the target file identifier.

23. The computer program of claim 13, wherein the unique file identifier and the target file identifier are universal file identifiers.

* * * * *